N. M. TERRY.
Carriage Curtain Fasteners.

No. 139,438.　　　　　　　　　　　Patented May 27, 1873.

Witnesses.　　　　　　　　　　　Inventor.
Phil. A. Garner　　　　　　　　　Nathaniel M. Terry.
G. F. Stenz　　　　　　　　　　　By
　　　　　　　　　　　　　　　　Attorney.

UNITED STATES PATENT OFFICE.

NATHANIEL M. TERRY, OF LYME, CONNECTICUT.

IMPROVEMENT IN CARRIAGE-CURTAIN FASTENERS.

Specification forming part of Letters Patent No. 139,438, dated May 27, 1873; application filed May 10, 1873.

*To all whom it may concern:*

Be it known that I, NATHANIEL M. TERRY, of Lyme, in the county of New London and State of Connecticut, have invented a certain new and useful Curtain or Flap Fastening for Carriages, &c., of which the following is a specification:

My invention consists in combining a hinged or pivoted holding head with its shank in a novel manner, whereby the head on being raised will readily receive the loop or button-hole of the curtain, or on being raised will, in a certain manner, release the same if it has already been applied thereto, and also whereby the ordinary strain on the curtain will serve to prevent the head from being raised except through special manipulation; and I do hereby declare that the following specification, taken in connection with the drawings furnished and forming a part of the same, is a clear and true description thereof, and of several fastenings embodying the same.

Figure 1:
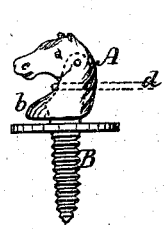
Figure 2:
Figure 3:
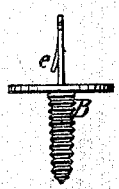
Figure 4:
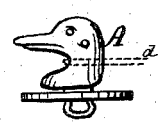
Figure 5:
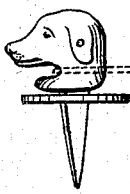
Figure 6:
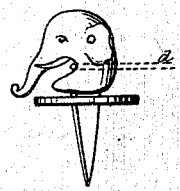
Figure 7:
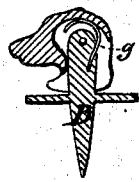
Figure 8:
Figure 9:
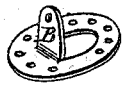

Referring to the drawings, Figure 1 represents one of my curtain-fastenings in perspective. Fig. 2 represents the same in vertical section. Fig. 3 represents the shank of the fastening detached and in edge view. Figs. 4, 5, and 6 represent different styles of heads embodying my invention. Figs. 7 and 8 represent the same in section. Fig. 9 represents another style of shank-plate.

A in each instance denotes the button-head. It can be made with great variety of outline, and, if desired, can be attractively made to represent the head of a horse, duck, dog, or elephant, as shown in the drawing. B denotes in each instance the stud or shank. It can be provided with a screw-thread and nut, either with the clinchable shanks, as shown in Figs. 5, 6, and 7, with the eye, as shown in Fig. 4, or with any other desirable arrangement, whereby it may be properly attached in working position. Each head is provided with a slot, cut, or recess for receiving and partially surrounding the upper end of the stud, and is pivoted thereto at a point above the neck *b*. In several of the figures horizontal dotted lines *d* denote the position of the curtain or other looped or button-holed flap, and illustrates the line of draft on the head when engaged therewith. It will be seen that all strain therefrom is borne by the front of the neck, and that the loop cannot be withdrawn except after the head is tilted up, as shown in Fig. 2. Inasmuch as the front of the neck in its movement from back to front carries the loop with which it is engaged from a point back of the pin-joint to a point considerably in front of it, the loop is by that movement stretched or strained to a certain degree, and in proportion as that strain exists will the head be more firmly held in proper position. If it be desirable that the head when down should present no projections with which a lady's dress could, for instance, objectionably engage, it may be provided with a guard having a form like that of the elephant's trunk, as shown in Fig. 8.

I am well aware that my improved fastenings are adapted to many uses more or less analogous to curtain or loop holding. As a frictional device to cause the head to so engage with the shank that it will not be liable to work loose and rattle, I apply a spring within the recess which shall engage with pressure on the head or shank. In Fig. 1 a spring tongue, *e*, is cut from the shank and bent slightly outward so as to engage with the interior of the recess. In Fig. 8 a spring, *f*, is secured in the top of the stud, and the wall of the recess being concentric with the stud the pressure is always the same between the spring and head whether the latter be up or down. In Fig. 7 the spring *g* serves not only as an anti-rattler, but it throws the head forward after being raised and released. These springs may obviously be applied to the head and made to bear on the shanks with similar results. These springs should, preferably, be composed of hardened brass or other metal not readily corroded.

The practicable methods of applying the anti-rattler springs are very numerous, and I am well aware that rubber in washers or other form may be economically and efficiently employed.

In some instances an eye will be undesirable on the shank-plate, as in Fig. 4, in which case the plate may be made in one piece of sheet metal, as in Fig. 9, with the shank B cut from the metal and bent up at right angles thereto, as shown. Holes in the plate will be provided for the use of small rivets or stitches.

Having thus described my invention, I claim as new and desire to secure by Letters Patent—

The recessed head A mounted on and pivoted to the stud or standard B, substantially as and for the purposes specified.

NATHANIEL M. TERRY.

Witnesses:
 J. M. RICE,
 MARSHAL OLIVER.